United States Patent
Natsume et al.

(10) Patent No.: US 10,793,191 B2
(45) Date of Patent: Oct. 6, 2020

(54) LOWER VEHICLE BODY STRUCTURE

(71) Applicant: Mazda Motor Corporation, Aki-gun, Hiroshima (JP)

(72) Inventors: Hirotaka Natsume, Hiroshima (JP); Hidenori Matsuoka, Hiroshima (JP); Keisuke Ebisumoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 116 days.

(21) Appl. No.: 16/246,696

(22) Filed: Jan. 14, 2019

(65) Prior Publication Data

US 2019/0217891 A1 Jul. 18, 2019

(30) Foreign Application Priority Data

Jan. 16, 2018 (JP) ................. 2018-004631

(51) Int. Cl.
| | |
|---|---|
| *B62D 21/03* | (2006.01) |
| *B62D 25/02* | (2006.01) |
| *B62D 25/04* | (2006.01) |
| *B62D 25/20* | (2006.01) |
| *B62D 21/15* | (2006.01) |

(52) U.S. Cl.
CPC ............ *B62D 21/03* (2013.01); *B62D 21/15* (2013.01); *B62D 25/025* (2013.01); *B62D 25/04* (2013.01); *B62D 25/20* (2013.01); *B62D 25/2036* (2013.01); *B62D 25/2045* (2013.01)

(58) Field of Classification Search
CPC ...... B62D 21/03; B62D 21/15; B62D 25/025; B62D 25/04; B62D 25/20; B62D 25/2036; B62D 25/2045
See application file for complete search history.

(56) References Cited

U.S. PATENT DOCUMENTS

2015/0145284 A1* 5/2015 Nishida ............ B62D 25/2036
296/187.1

FOREIGN PATENT DOCUMENTS

JP 2016132399 A 7/2016

* cited by examiner

*Primary Examiner* — D Glenn Dayoan
*Assistant Examiner* — Melissa Ann Bonifazi
(74) *Attorney, Agent, or Firm* — Alleman Hall Creasman & Tuttle LLP

(57) ABSTRACT

A lower vehicle body structure includes a vehicle body floor having a bottom surface part, a floor tunnel bulging upwardly from the bottom surface part and extending in vehicle front-and-rear directions, side sills extending in the front-and-rear directions, hinge pillars extending upwardly from the side sills, first frames, lowered parts and second frames. Each first frame extends in the front-and-rear directions between the floor tunnel and a side sill. Each lowered part is provided to the bottom surface part between a first frame and a side sill so as to be lowered below a part where the floor and the side sills are joined. Each second frame extends to a first frame, obliquely rearwardly and inwardly from a side sill along an upper surface of the bottom surface part, and forms in a part including a lowered part a closed cross-section between the bottom surface part and a second frame.

12 Claims, 6 Drawing Sheets

LOWER VEHICLE BODY STRUCTURE

TECHNICAL FIELD

The present disclosure relates to a lower vehicle body structure provided with side sills extending in vehicle front-and-rear directions along side parts of a vehicle body floor, and belongs to the production engineering field.

BACKGROUND OF THE DISCLOSURE

When a vehicle experiences a front collision, the impact load is generally distributed to each part of the vehicle body via a pair of left and right front side frames provided in a front part of the vehicle body so as to extend in vehicle front-and-rear directions. Therefore, deformation of the cabin is reduced, and for a larger impact load, the load can be absorbed by the front side frames being crushed.

When a vehicle experiences a so-called "small overlap collision" in which a vehicle part outside the front side frames in vehicle width directions overlaps a colliding object, a front wheel disposed in the overlapping part is pushed rearwardly with respect to the vehicle body, and the impact load may then be transmitted to a hinge pillar from this front wheel.

The impact load transmitted to the hinge pillar is distributed to the rear side of the vehicle body by being transmitted to a side sill extending rearwardly from a lower end part of the hinge pillar, a front pillar extending rearwardly and upwardly from an upper end part of the hinge pillar, an impact bar of a front door, etc., in this order. Thus, the load distribution from the hinge pillar to each rear vehicle body part prevents a deformation of the cabin in which the hinge pillar and a dashboard are pushed rearward.

JP2016-132399A discloses a lower vehicle body structure provided with a slanting frame extending obliquely rearward from a front end part of the side sill, and inwardly in the vehicle width directions. In the vehicle with this kind of lower vehicle body structure, the impact load transmitted to the front end part of the side sill by the small overlap collision may not only be transmitted rearwardly via the side sill, but may also be transmitted obliquely rearward via the slanting frame. Since the load distribution path (load pass) via the slanting frame is added, the impact load is more effectively distributed, thereby improving the deformation control effect for the cabin.

In detail, the slanting frame disclosed in JP2016-132399A is coupled to the side sill at the front end part and is coupled to a floor tunnel at the rear end part. Thus, the impact load transmitted to the front end part of the side sill by the small overlap collision may be transmitted rearwardly along the side sill, and may also be transmitted to the floor tunnel via the slanting frame.

Meanwhile, in order to further improve fuel consumption and vehicle maneuverability, weight reduction of the vehicle body has been increasingly demanded in recent years. Regarding this demand, the structure disclosed in JP2016-132399A in which the long slanting frame is provided so as to cover a broad vehicle section from the side sill to the floor tunnel results in a weight increase of the slanting frame. Therefore, there is still room for improvement in this structure.

Even if the body weight is reduced by shortening the length of the slanting frame, concrete solutions to the problem of how the impact load caused by the small overlap collision would be distributed effectively via the shortened slanting frame have not been yet proposed.

SUMMARY OF THE DISCLOSURE

One purpose of the present disclosure is to provide a lower vehicle body structure, which can improve a distribution effect of an impact load caused by a small overlap collision, while reducing the weight of the vehicle body.

According to one aspect of the present disclosure, a lower vehicle body structure is provided, which includes a vehicle body floor having a bottom surface part, a floor tunnel bulging upwardly from the bottom surface part of the vehicle body floor, and extending in vehicle front-and-rear directions, side sills extending in the vehicle front-and-rear directions along edge parts of the vehicle body floor in vehicle width directions, hinge pillars extending upwardly from front end parts of the side sills, first frames, each extending in the vehicle front-and-rear directions at least along an upper surface of the vehicle body floor, between the floor tunnel and one of the side sills, lowered parts, each provided to the bottom surface part between one of the first frames and one of the side sills so as to be lowered below a part where the vehicle body floor and the side sills are joined, and second frames, each provided so as to extend to one of the first frames, obliquely rearward from one of the side sills along an upper surface of the bottom surface part and inwardly in the vehicle width directions, and forming in a part including one of the lowered parts a closed cross-section with the bottom surface part.

According to this configuration, since the lowered part is provided to the bottom surface part of the vehicle body floor, a large closed cross-section can be formed between the bottom surface part and the second frame extending obliquely rearward from the side sill along the upper surface of the bottom surface part and inwardly in the vehicle width directions. Moreover, since a rear end part of the second frame is connected to the first frame between the side sill and the floor tunnel, the second frame is short compared to a case the rear end part is connected to the floor tunnel. Therefore, rigidity of the second frames is increased.

Therefore, an impact load inputted from the front of the vehicle due to a small overlap collision is not only transmitted to the rear side of the vehicle via the side sills, but also effectively transmitted obliquely rearward via the second frames. The impact load transmitted obliquely rearward through the second frames may be further transmitted rearwardly via the first frames. Thus, since a load transmitting path toward a rear side of the vehicle via the second frames and the first frames functions effectively, an effect of preventing cabin deformation caused by the small overlap collision can be improved.

The bottom surface part may have outward slope parts, each extending obliquely upward toward one of the side sills from an outer end part of one of the lowered parts in the vehicle width directions.

According to this configuration, since the outward slope parts extending obliquely upward toward the side sills from the outer end parts of the lowered parts in the vehicle width directions are provided in the bottom surface part of the vehicle body floor, the shape of the closed cross-sections formed between the bottom surface part of the vehicle body floor and the second frames is prevented from changing rapidly within a longitudinal range from the side sills to the lowered parts. Therefore, since it becomes easy to prevent the cross-sectional collapse of the closed cross-sections when transmitting the impact load, a yield strength of the second frames against the impact load caused by the small overlap collision is easy to secure.

The bottom surface part may have inward slope parts, each extending obliquely upward toward the floor tunnel from an inner end part of one of the lowered parts in the vehicle width directions.

According to this configuration, since the inward slope parts extending obliquely upward toward the floor tunnel from the inner end parts of the lowered parts in the vehicle width directions are provided to the bottom surface part of the vehicle body floor, the cross-sectional deformation of the inner parts with respect to the lowered parts in the bottom surface part can be reduced.

Each of the first frames may include an upper frame member joined to the upper surface of the vehicle body floor, and a lower frame member joined to a lower surface of the vehicle body floor so as to form with the upper frame member a closed cross-section continuing in the vehicle front-and-rear directions. At least a part of each inward slope part may be disposed within the closed cross-section formed by one of the upper frame members and one of the lower frame members.

According to this configuration, since the inward slope parts of the vehicle body floor traverse in a diagonally bracing manner in the closed cross-section of the first frames formed with the upper frame members and the lower frame members, the cross-sectional collapse of the first frames can be reduced effectively when the impact load is applied in the vehicle width directions. Therefore, when the small overlap collision occurs, the load toward the rear side of the vehicle can be distributed effectively via the second frames and the first frames.

Each of the side sills may form a closed cross-section continuing in the vehicle front-and-rear directions. Each of the lowered parts may be located below a lower end of one of the closed cross-sections of the side sills, within a section in the vehicle front-and-rear directions where the closed cross-section is formed between one of the lowered parts and one of the second frames.

According to this configuration, since the lowered parts in the bottom surface part are located below the lower ends of the closed cross-sections of the side sills, an area of the closed cross-sections formed between the bottom surface part and the second frames is effectively increased. Therefore, the yield strength of the second frames against the impact load caused by the small overlap collision is effectively increased.

DETAILED DESCRIPTION OF THE DISCLOSURE

Figure 1:
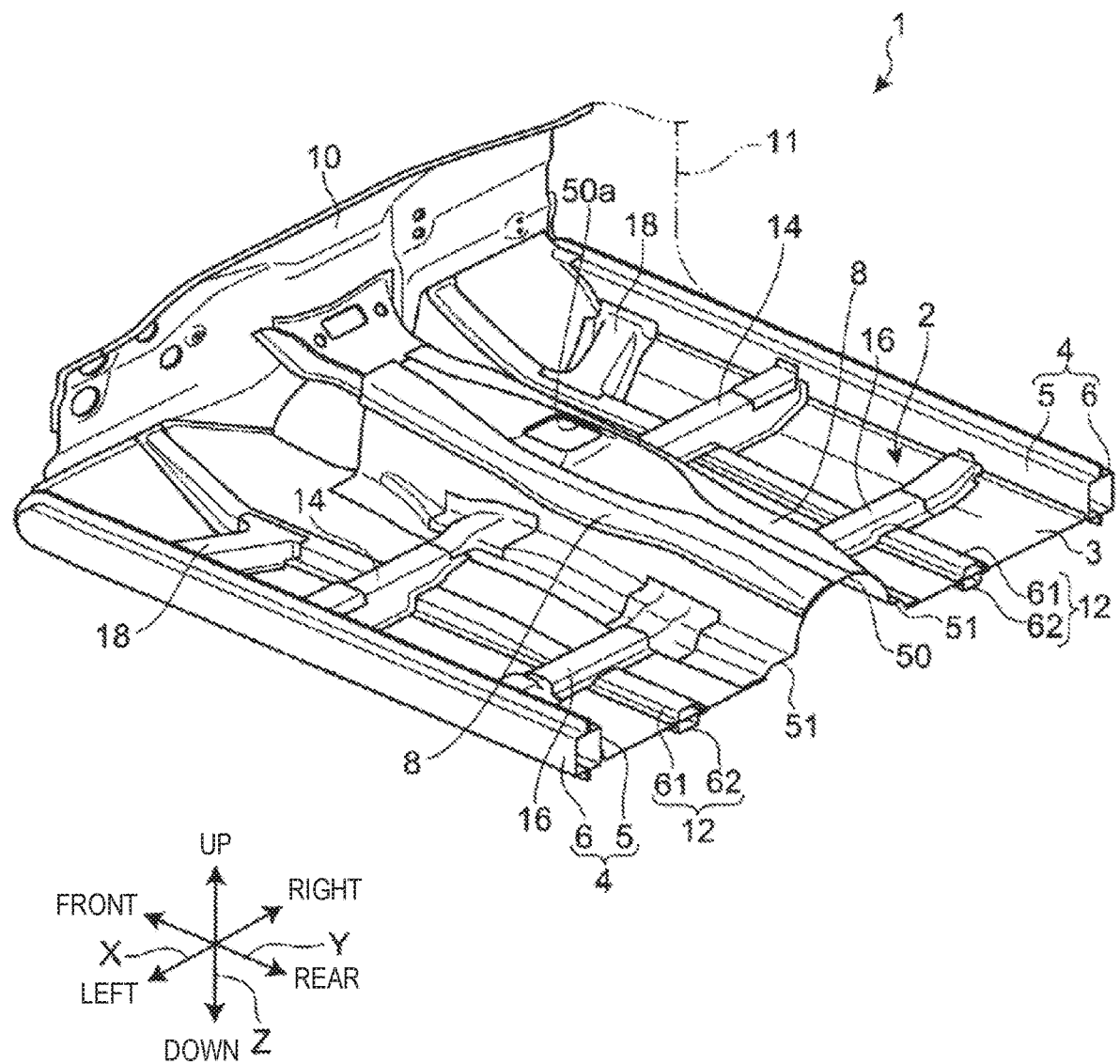
FIG. 1 is a perspective view illustrating a lower vehicle body structure according to one embodiment of the present disclosure.

Hereinafter, a lower vehicle body structure according to one embodiment of the present disclosure is described with reference to the accompanying drawings. Note that in the following description, directional terms, such as "front," "rear," "right," "left," "up," and "down," indicate corresponding directions of a vehicle body when the heading of the vehicle traveling is "to the front or forward," unless otherwise particularly described. Moreover, in the accompanying drawings, a reference character "X" is given to vehicle width directions, a reference character "Y" to vehicle front-and-rear directions, and the reference character "Z" to vehicle up-and-down directions.

[Entire Structure]

Figure 2:
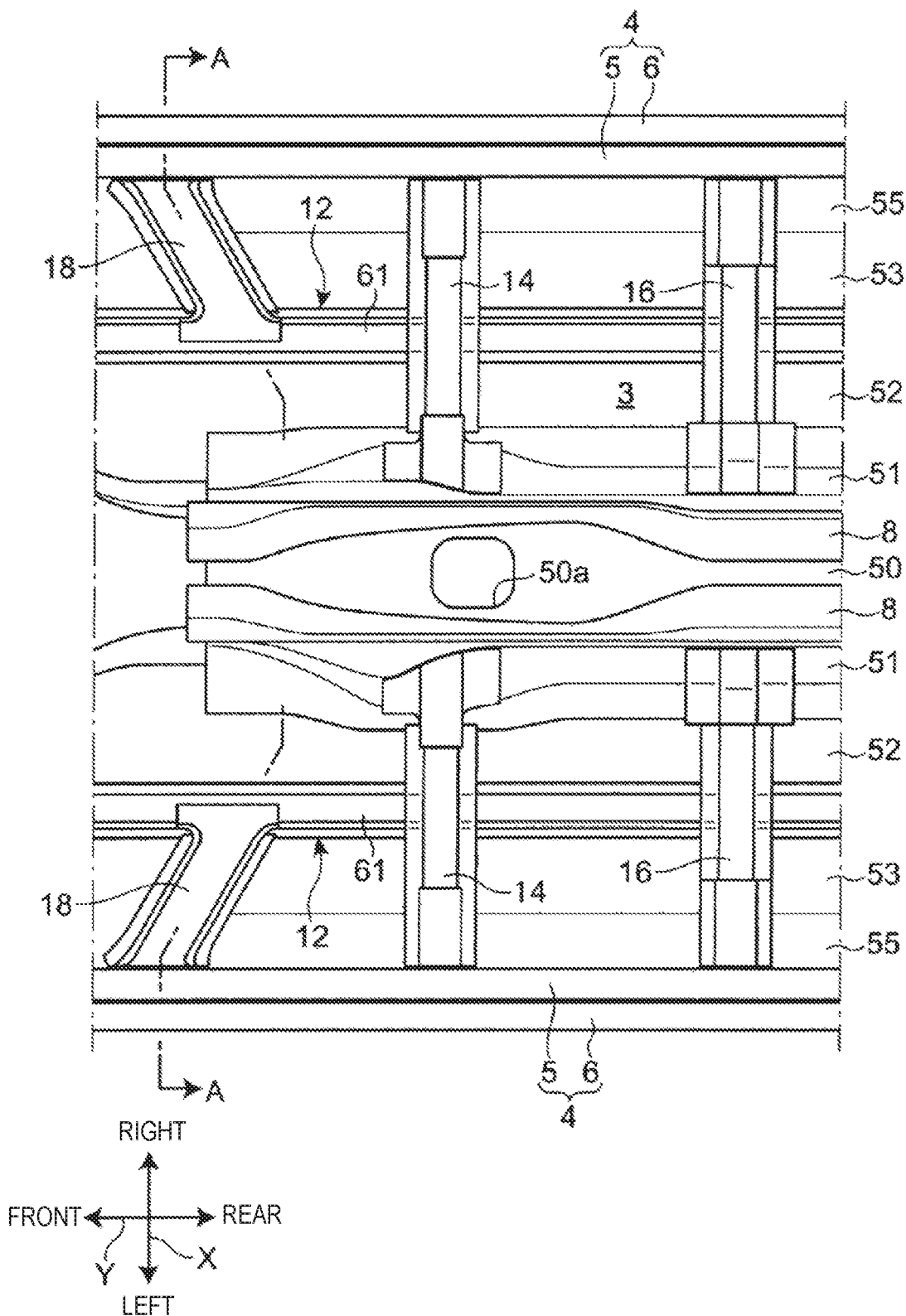
FIG. 2 is a plan view illustrating the lower vehicle body structure.
Figure 3:
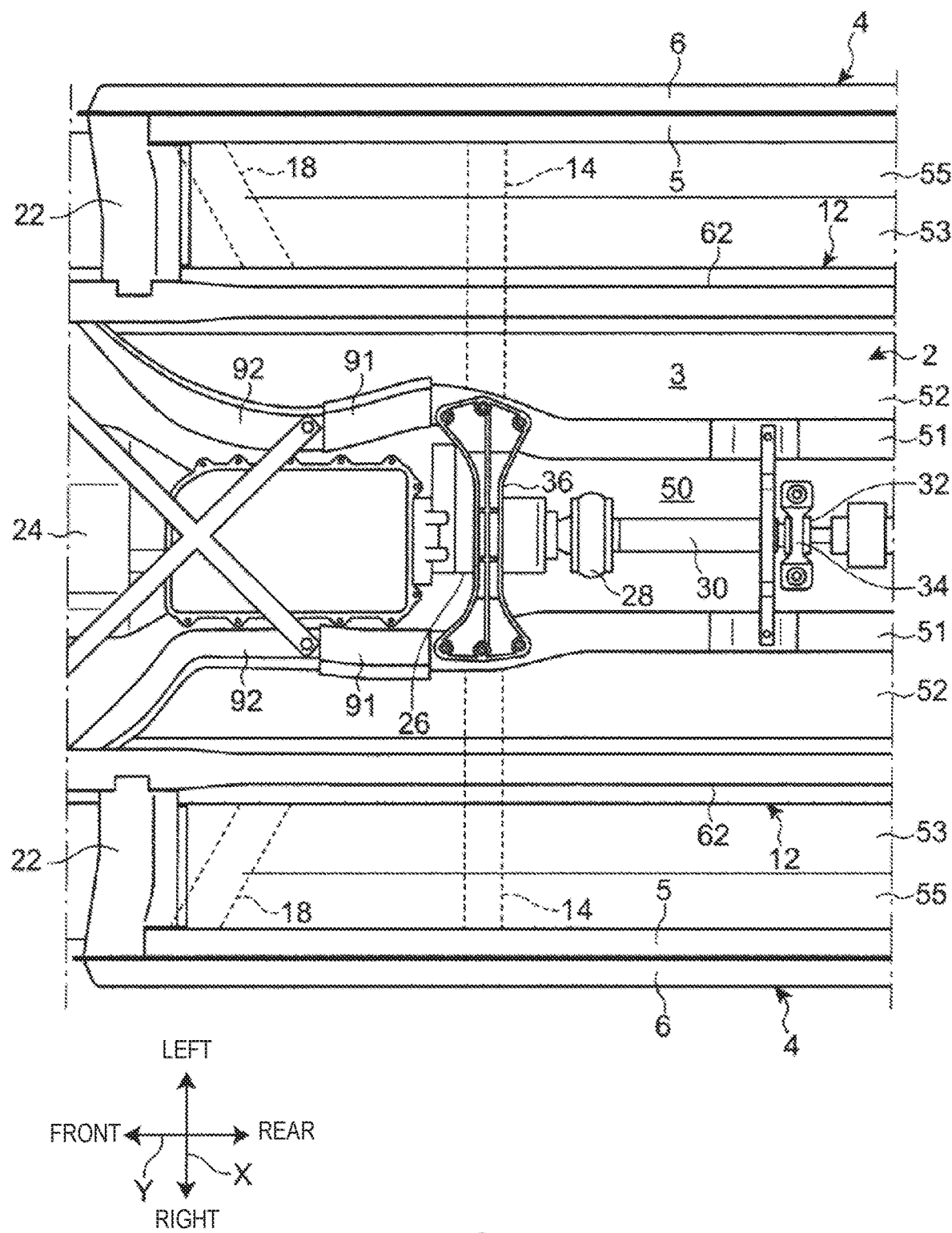
FIG. 3 is a bottom view illustrating the lower vehicle body structure.

As illustrated in a perspective view of FIG. 1, a plan view of FIG. 2, and a bottom view of FIG. 3, an automobile or vehicle 1 provided with a lower vehicle body structure according to this embodiment includes a vehicle body floor 2 which constitutes a floor surface of a vehicle interior space, a pair of side sills 4 extending in the vehicle front-and-rear directions Y along both side surfaces of the vehicle body floor 2 in the vehicle width directions X, and a dash board 10 disposed in front of the vehicle body floor 2.

Each side sill 4 includes a side sill inner part 5 of a hat shape in cross section, which opens outwardly in the vehicle width direction X, and a side sill outer part 6 of a hat shape in cross section, which opens inwardly in the vehicle width direction X. The side sill inner part 5 and the side sill outer part 6 are mutually joined to form a closed cross-section which continues to the vehicle front-and-rear directions Y.

The vehicle 1 further includes a pair of hinge pillars 11 (see FIG. 1) which rise from respective front end parts of the left and right side sills 4, and extend upwardly (vehicle up-and-down directions Z), and the dash board 10 is bridged between the pair of hinge pillars. The dash board 10 partitions the vehicle interior space and an engine bay in the vehicle front-and-rear directions Y.

The vehicle body floor 2 includes a bottom surface part 3, and a floor tunnel 50 formed so as to be bulged upwardly from the bottom surface part 3. The floor tunnel 50 is formed so as to extend in the vehicle front-and-rear directions Y in the central part of the vehicle body floor 2 in the vehicle width directions X. The cross-sectional shape of the floor tunnel 50 seen in the vehicle front-and-rear directions Y is a U-shape which opens downwardly.

An opening 50a through which a shift lever (not illustrated) passes is formed in an upper surface part of the floor tunnel 50. Reinforcement members 8 extending in the vehicle front-and-rear directions Y are joined to both side parts in the vehicle width directions X in the upper surface part of the floor tunnel 50, for example, by welding, respectively, thereby increasing the rigidity of the floor tunnel 50. Detailed structure of the vehicle body floor 2 will be described later.

A pair of left and right floor frames 12 extending in the vehicle front-and-rear directions Y are joined to the bottom surface part 3 of the vehicle body floor 2. Each floor frame 12 is disposed between the floor tunnel 50 and the corresponding side sill 4 in the vehicle width directions X. As illustrated in FIG. 3, each floor frame 12 is coupled to the front end part of the side sill 4 through a torque box 22 extending in the vehicle width directions X.

As illustrated in FIG. 1, each floor frame 12 includes an upper frame member 61 joined to an upper surface of the vehicle body floor 2, for example, by welding, and a lower frame member 62 joined to a lower surface of the vehicle body floor 2, for example, by welding. Each upper frame member 61 and lower frame member 62 is disposed so as to oppose each other, having the vehicle body floor 2 therebetween. Each upper frame member 61 and lower frame member 62 is disposed so as to extend in the vehicle front-and-rear directions Y, and they together form a closed cross-section which continues to the vehicle front-and-rear directions Y.

Moreover, as a floor cross member extending in the vehicle width directions X, a pair of left and right first cross members 14, and a pair of left and right second cross members 16 are joined to the upper surface of the bottom surface part 3 of the vehicle body floor 2. Each first cross member 14 and each second cross member 16 are bridged between the floor tunnel 50 and the side sill 4.

The left and right first cross members 14 overlap with the opening 50*a* of the floor tunnel 50 in the vehicle front-and-rear directions Y and is disposed substantially at the same position. Similarly, the left and right second cross members 16 are disposed at substantially the same position in the vehicle front-and-rear directions Y, which is rearward of the first cross members 14.

Each first cross member 14 is a member having a hat-like cross-sectional shape which opens downwardly, and forms with the vehicle body floor 2 a closed cross-section which continues to the vehicle width directions X. The second cross member 16 is also a member having a hat-like cross-sectional shape which opens downwardly, and forms with the vehicle body floor 2 a closed cross-section which continues to the vehicle width directions X, similar to the first cross member 14.

A pair of left and right slanting frames 18 are joined to the upper surface of the bottom surface part 3 of the vehicle body floor 2, for example, by welding. The slanting frames 18 are disposed at a position forward of the first cross members 14, and extend inward in the vehicle width directions X and incline rearward. A front end part of each slanting frame 18 is coupled to a part near a front end of the side sill 4. The coupling part of the slanting frames 18 to the side sills 4 is located so as to overlap with the hinge pillar 11 in the vehicle front-and-rear directions Y (see FIG. 1). A rear end part of each slanting frame 18 is coupled to the corresponding floor frame 12. Detailed structure of the slanting frames 18 will be described later.

The vehicle 1 of this embodiment is, for example, a front-engine rear-drive (FR) vehicle provided with a longitudinal power train. The power train of the vehicle 1 includes an engine (not illustrated) as a driving source mounted inside an engine bay in front of the dash board 10 (see FIG. 1), and a transmission 24 (see FIG. 3) coupled to a rear part of the engine.

As illustrated in FIG. 3, the transmission 24 is, for example, a longitudinal automatic transmission having an output shaft (not illustrated) extending in the vehicle front-and-rear directions Y. The transmission 24 may be a manual type. A rear end part of the output shaft of the transmission 24 is coupled to a propeller shaft 30 extending in the vehicle front-and-rear directions Y via a universal joint 28. Thus, the engine output can be transmitted to rear wheels via the transmission 24, the propeller shaft 30, etc.

The propeller shaft 30 is disposed inside the floor tunnel 50. The propeller shaft 30 is supported by a lower surface of the floor tunnel 50 via a bearing 32 and a support member 34.

A rear part of the transmission 24 is also disposed in the floor tunnel 50. A supported part 26 supported by a mount member 36 from below the floor tunnel 50 is provided to the rear part of the transmission 24. The supported part 26 is provided to a rear end part of the transmission 24.

The mount member 36 is a cast part made of, for example, aluminum alloy. The mount member 36 is fixed to the vehicle body floor 2 at a position in the vehicle front-and-rear direction Y where the mount member 36 overlaps with the first cross members 14. Thus, the rear part of the transmission 24 is supported by the vehicle body via the mount member 36. Note that a front part of the transmission 24 is supported by the vehicle body (e.g., a front suspension member) via the engine and engine mount(s) (not illustrated).

[Vehicle Body Floor]

Figure 4:
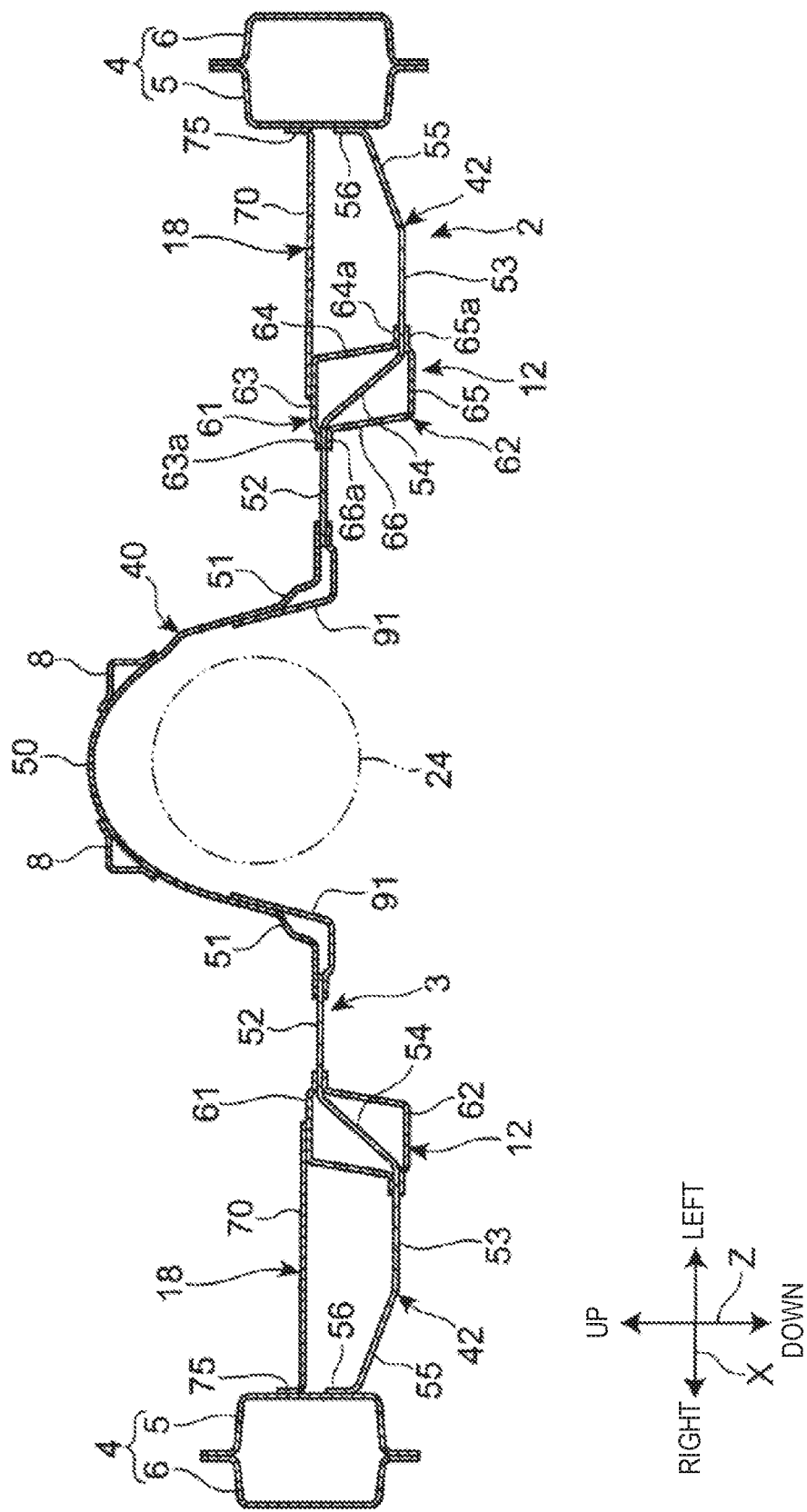
FIG. 4 is a cross-sectional view taken along a line A-A in FIG. 2, illustrating a part of the lower vehicle body structure where a slanting frame is provided, viewed from the front side.

Detailed structure of the vehicle body floor 2 at the portion where the slanting frame 18 is provided, and its periphery are described mainly with reference to a cross-sectional view of FIG. 4. Note that the cross-sectional view of FIG. 4 is taken along a line A-A in FIG. 2.

As illustrated in FIG. 4, the vehicle body floor 2 is comprised of a tunnel panel 40 which constitutes the floor tunnel 50, and a pair of left and right bottom surface panels 42 which constitute the bottom surface part 3. The tunnel panel 40 is disposed in a central part in the vehicle width directions X of an area between the left and right side sills 4. Each bottom surface panel 42 is provided so as to couple the tunnel panel 40 to the corresponding side sill 4.

The tunnel panel 40 and the bottom surface panels 42 are pressed parts, for example, made of steel. The tunnel panel 40 may desirably have the rigidity and strength higher than the bottom surface panels 42, thereby increasing the rigidity and strength of the floor tunnel 50.

The vehicle body floor 2 further includes a pair of raised parts 51, between the bottom surface part 3 and the floor tunnel 50, which are raised toward the inside in the vehicle width directions X from the bottom surface part 3 and continue to lower edge parts of the floor tunnel 50. Each raised part 51 is provided so as to extend in the vehicle front-and-rear directions Y along the lower edge part of the floor tunnel 50 (see FIG. 1), from a position forward of the first cross member 14 to a position rearward of the second cross member 16.

Thus, the boundary parts between the bottom surface part 3 and the lower edge parts of the floor tunnel 50 are increased in the rigidity by being provided with the raised part 51 which is integral with the vehicle body floor 2. Therefore, the reinforcement along the lower edge parts of the floor tunnel 50 is achieved in the areas in the vehicle front-and-rear directions Y where the raised parts 51 are provided, without providing a separate reinforcement member from the vehicle body floor 2.

As illustrated in FIG. 3, reinforcement members 91 and 92 extending in the vehicle front-and-rear directions Y along the boundary parts between the bottom surface part 3 and the lower edge parts of the floor tunnel 50 are provided in a front part of the vehicle body floor 2. The reinforcement members 91 and 92 are provided in the part ranging from a position where the members overlap with a front end part of the raised parts 51 to a position forward of the raised parts 51 in the vehicle front-and-rear directions Y. Thus, the portion where the raised parts 51 are not provided is reinforced by the reinforcement members 91 and 92.

In this embodiment, the raised parts 51 are comprised of a part of the tunnel panel 40. Note that the raised parts 51 may be comprised of parts of the bottom surface panels 42, or may be comprised of separate floor structural members from the tunnel panel 40 and the bottom surface panels 42.

The bottom surface part 3 of the vehicle body floor 2 includes a pair of left and right middle parts 52 which continue outwardly in the vehicle width directions X from the raised parts 51, respectively, and a pair of left and right lowered parts 53 which are lowered toward the outside in the vehicle width directions from the middle parts 52, respectively.

The middle parts 52 are disposed along a plane substantially perpendicular to the vehicle up-and-down directions Z. Each middle part 52 constitutes an inward end part of the bottom surface panel 42 in the vehicle width directions X. The middle part 52 is disposed at a height overlapping with the closed cross-section of the side sill 4 in the vehicle up-and-down directions Z. The lowered parts 53 are disposed along a plane substantially perpendicular to the vehicle up-and-down directions Z. Each lowered part 53 constitutes a lowermost part of the vehicle body floor 2 in the vehicle up-and-down directions Z, and is disposed below a lower end of the closed cross-section of the side sill 4.

Moreover, the bottom surface part 3 of the vehicle body floor 2 further includes inward slope parts 54 which extend from inner edge parts of the lowered parts 53 in the vehicle width directions X, obliquely upward toward the floor tunnel 50, outward slope parts 55 which extend from outer edge parts of the lowered parts 53 in the vehicle width directions X, obliquely upward toward the side sills 4, and joined parts 56 which extend upwardly from an outer edge part of the outward slope part 55 in the vehicle width directions X, and are joined to the side sills 4.

An upper edge part of each inward slope part 54 continues to an outer edge part of the middle part 52 in the vehicle width directions X. A corner part of an obtuse angle is formed between the inward slope part 54 and the middle part 52. A lower edge part of the inward slope part 54 continues to an inner edge part of the lowered part 53 in the vehicle width directions X. A corner part of an obtuse angle is formed between the inward slope part 54 and the lowered part 53. Thus, the bottom surface part 3 is constructed so as to be raised gently from the lowered part 53 toward the inside in the vehicle width directions X, thereby preventing a cross-sectional deformation of the bottom surface part 3, inward of the lowered part 53 in the vehicle width directions X.

The upper frame members 61 and the lower frame members 62, which constitute the floor frames 12, are disposed so as to oppose to each other, having the inward slope part 54 therebetween.

Each upper frame member 61 has an upper surface part 63 which is disposed adjacent outwardly to the middle part 52 of the bottom surface part 3 in the vehicle width directions X, and a side surface part 64 extending downwardly from an outer edge part of the upper surface part 63 in the vehicle width directions X. The upper surface part 63 is disposed along a plane substantially perpendicular to the vehicle up-and-down directions Z. The side surface part 64 inclines downwardly and slightly outwardly in the vehicle width directions X.

Each upper frame member 61 further has an upper flange part 63a further extending inwardly in the vehicle width directions X from an inner edge part of the upper surface part 63 in the vehicle width directions X, and a lower flange part 64a extending outwardly in the vehicle width directions X from a lower edge part of the side surface part 64. The upper flange part 63a is joined to an upper surface of an outer edge part in the vehicle width directions X in the middle part 52 of the bottom surface part 3, for example, by welding. The lower flange part 64a is joined to an upper surface of an inner edge part in the vehicle width directions X in the lowered part 53 of the bottom surface part 3, for example, by welding.

Each lower frame member 62 has a lower surface part 65 which is disposed adjacent inwardly in the vehicle width directions X to the lowered part 53 of the bottom surface part 3, and a side surface part 66 extending upwardly from an inner edge part of the lower surface part 65 in the vehicle width directions X. The lower surface part 65 is disposed substantially parallel to the upper surface part 63 of the upper frame members 61, and opposes to the upper surface part 63, having the inward slope part 54 there between. The side surface part 66 is disposed substantially parallel to the side surface part 64 of the upper frame members 61, and opposite to the side surface part 64, having the inward slope part 54 therebetween.

The lower frame members 62 further have a lower flange part 65a further extending outwardly in the vehicle width directions X from an outer edge part of the lower surface part 65 in the vehicle width directions X, and an upper flange part 66a extending inwardly in the vehicle width directions X from an upper edge part of the side surface part 66. The upper flange part 66a is disposed so as to oppose to the upper flange part 63a of the upper frame members 61, having the middle part 52 of the bottom surface part 3 therebetween, and is joined to a lower surface of the middle part 52, for example, by welding. The lower flange part 65a is disposed so as to oppose to the lower flange part 64a of the upper frame members 61, having the lowered part 53 of the bottom surface part 3 therebetween, and is joined to a lower surface of the lowered part 53, for example, by welding.

A parallelogram closed cross-section is formed between each upper frame member 61 and lower frame member 62 which are joined to the bottom surface part 3 as described above. The inward slope part 54 of the bottom surface part 3 is disposed inside the closed cross-section of the floor frames 12. That is, the bottom surface part 3 traverses the closed cross-section of the floor frames 12 in a diagonally bracing manner. Therefore, a so-called matchbox deformation in which the distance between the upper surface part 63 and the lower surface part 65 is reduced in the vehicle up-and-down directions Z is effectively reduced in the closed cross-section of the floor frames 12.

A lower edge part of the outward slope part 55 continues to the outer edge part of the lowered part 53 in the vehicle width directions X. A corner part of an obtuse angle is formed between the outward slope part 55 and the lowered part 53. Thus, the bottom surface part 3 is constructed so as to be raised gently from the lowered part 53 outwardly in the vehicle width directions X. Therefore, the cross-sectional deformation of the bottom surface part 3 can be reduced also the outer part of the lowered part 53 in the vehicle width directions X.

An upper edge part of the outward slope part 55 continues to a lower edge part of the joined part 56. A corner part of an obtuse angle is formed between the outward slope part 55 and the joined part 56. The joined part 56 is joined to a side surface of the side sill inner part 5 inside the cabin in the side sill 4, for example by welding.

Note that the cross-sectional shape of the vehicle body floor 2 taken along the line A-A in FIG. 2 is not limited to the structure illustrated in FIG. 4, and may be changed suitably. For example, the middle part 52 which intervenes between the raised part 51 and the lowered part 53 may be formed in two or more steps, or may be omitted.

[Slanting Frame]

Detailed structure of the slanting frames 18 is described with reference to perspective views of FIGS. 5 and 6. Although the slanting frame 18 disposed on the right side of the vehicle body is illustrated in FIGS. 5 and 6, the slanting frame 18 on the left side of the vehicle body has a laterally symmetrical structure to the right slanting frame 18.

Figure 5:
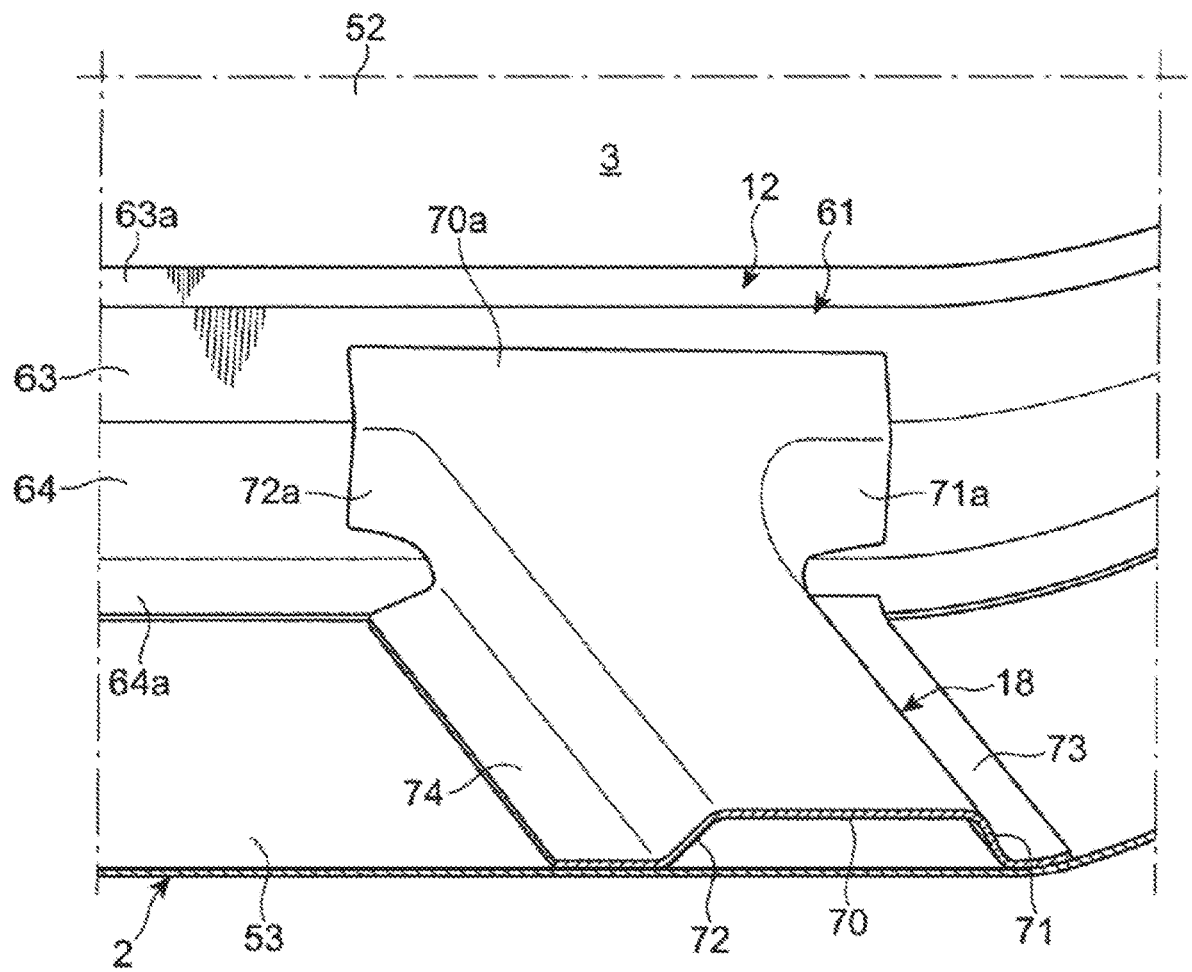
FIG. 5 is a broken perspective view illustrating a part of the slanting frame and its periphery, viewed from the outside in vehicle width directions.
Figure 5:
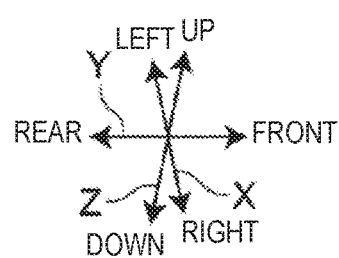
Figure 6:
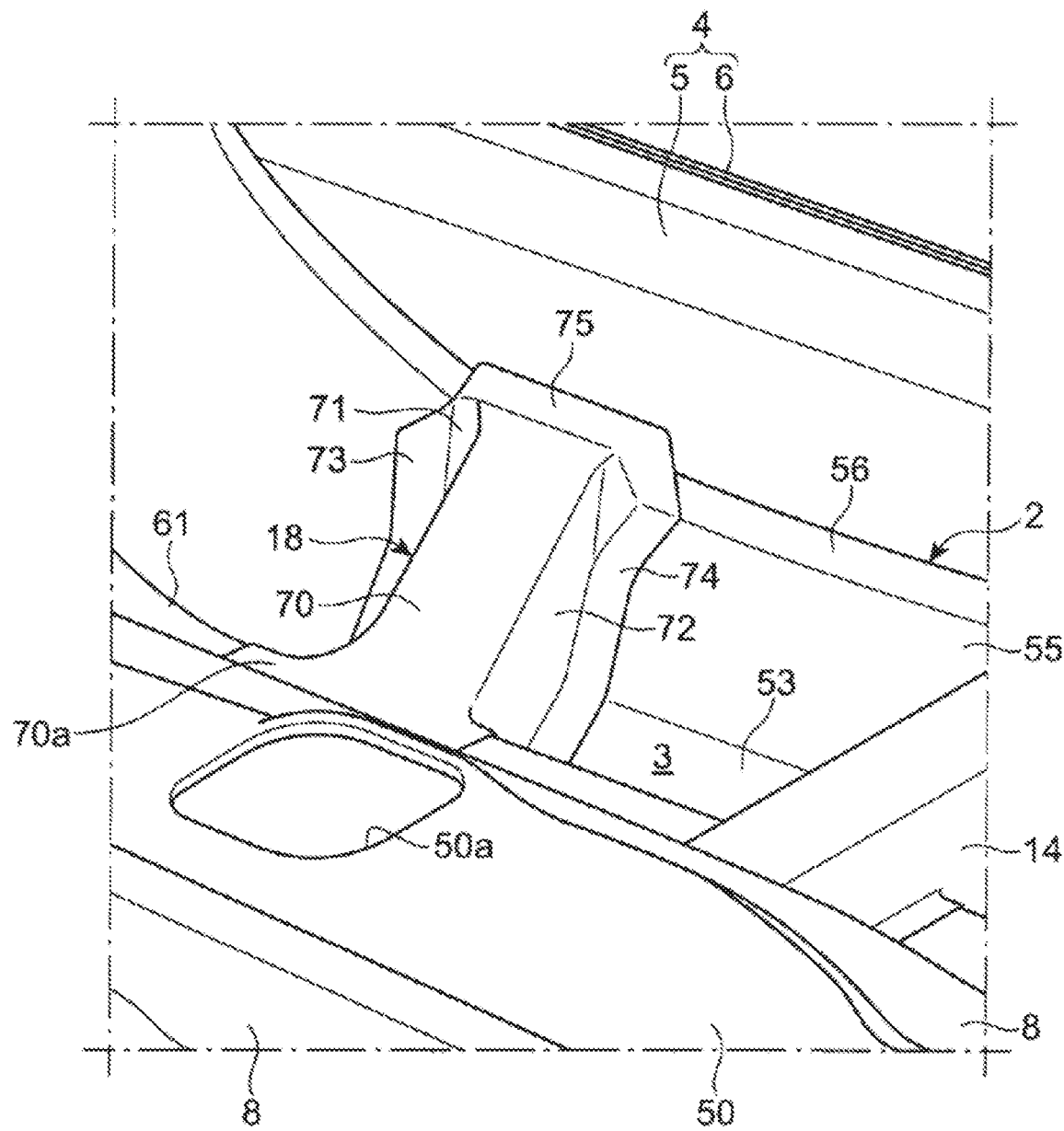
FIG. 6 is a perspective view illustrating the slanting frame and the periphery, viewed from the inside in the vehicle width directions.

As illustrated in FIGS. 5 and 6, the slanting frame 18 is a member having a hat-like cross-sectional shape which opens downwardly. The slanting frame 18 is, for example, a pressed part made of steel. Each slanting frame 18 includes an upper surface part 70 which is disposed so as to oppose the bottom surface part 3 of the vehicle body floor 2 from above and extends in the longitudinal directions of the slanting frame 18, a front surface part 71 extending downwardly from a front edge part of the upper surface part 70, a rear surface part 72 extending downwardly from a rear edge part of the upper surface part 70, a front flange part 73 extending forward from a lower edge part of the front surface part 71, and a rear flange part 74 extending rearwardly from a lower edge part of the rear surface part 72.

The upper surface part 70 of the slanting frames 18 is disposed substantially perpendicular to the vehicle up-and-down directions Z. An expanded part 70a widened in the vehicle front-and-rear directions Y is formed on an inner end part of the upper surface part 70 in the vehicle width directions. The expanded part 70a is joined to the upper surface part 63 of the upper frame member 61 of the floor frames 12, for example, by welding.

As illustrated in FIG. 5, a forward extended portion 71a curved and extending forward is formed in an inner end part of the front surface part 71 in the vehicle width directions X, and a rearward extended portion 72a curved and extending rearward is formed an inner end part of the rear surface part 72 in the vehicle width directions X. The forward extended portion 71a and the rearward extended portion 72a are joined to the side surface part 64 of the upper frame members 61, for example, by welding.

The front flange part 73 and the rear flange part 74 of each slanting frame 18 are joined to the upper surface of the bottom surface part 3 of the vehicle body floor 2, for example, by welding. Thus, a closed cross-section which continues in the longitudinal directions of the slanting frame 18 is formed between the bottom surface part 3 and the slanting frame 18 extending along the upper surface of the bottom surface part 3.

As illustrated in FIG. 6, an outer flange part 75 is formed in an outer end part of each slanting frame 18 in the vehicle width directions X. Each outer flange part 75 is provided, for example, along outer edge parts of the upper surface part 70, the front surface part 71, and the rear surface part 72 in the vehicle width directions X. Each outer flange part 75 is joined to the side surface of the side sill inner part 5 of one of the side sills 4 inside the cabin, for example, by welding. A part of the outer flange part 75 is joined to the side sill 4 via the joined part 56 of the vehicle body floor 2.

[Operation and Effects]

As illustrated in FIG. 4, each slanting frame 18 covers from the side sill 4 to the floor frame 12, and forms a closed cross-section between the lowered part 53 and the outward slope part 55 in the bottom surface part 3. In the vehicle up-and-down directions Z, the lowered part 53 is disposed lower than the joined part 56 joined to the side sill 4, and in more detail, lower than the lower end of the closed cross-section of the side sill 4. Thus, a large space is formed in the vehicle up-and-down directions Z between the lowered part 53 and the upper surface part 70 of the slanting frame 18.

Therefore, according to this embodiment, a large closed cross-section can be formed between the bottom surface part 3 and each slanting frame 18. Moreover, the slanting frames 18 are comparatively short within a range between the side sills 4 and the floor frames 12. Therefore, the rigidity of the slanting frames 18 is increased effectively.

Therefore, the impact load inputted from the front of the vehicle due to the small overlap collision is not only transmitted to the rear side of the vehicle via the side sills 4, but also effectively transmitted obliquely rearward via the slanting frames 18. The impact load transmitted obliquely rearward through the slanting frames 18 may be further transmitted rearwardly via the floor frames 12. Thus, since the load transmitting path toward a rear side of the vehicle via the slanting frames 18 and the floor frames 12 functions effectively as described above, the effect of preventing cabin deformation caused by the small overlap collision can be improved.

Moreover, since the outward slope part 55 extending obliquely upward toward the side sill 4 from the outer end part of the lowered part 53 in the vehicle width directions X is provided in the bottom surface part 3 of the vehicle body floor 2, the shape of the closed cross-section formed between the bottom surface part 3 of the vehicle body floor 2 and each slanting frame 18 does not change rapidly at an intermediate location of the slanting frames 18 in the longitudinal directions. Therefore, since it becomes easy to prevent the cross-sectional collapse of the closed cross-section when transmitting the impact load, the yield strength of the slanting frames 18 against the impact load caused by the small overlap collision is easy to secure.

Further, as described above, since the part including the inward slope part 54 of the vehicle body floor 2 traverses in the diagonally bracing manner in the closed cross-section of the floor frames 12, the so-called matchbox deformation can be reduced. Thus, the cross-sectional collapse of the floor frames 12 can be reduced effectively when the impact load is applied in the vehicle width directions X. Therefore, when the small overlap collision occurs, the cross-sectional collapse of the floor frames 12 caused by the load transmission from the slanting frames 18 can be reduced effectively, and the load toward the rear side of the vehicle via the slanting frames 18 and the floor frames 12 can be distributed effectively.

As described above, although the present disclosure is described by illustrating the embodiment, the present disclosure is not limited to this embodiment.

For example, in the above embodiment, as illustrated in FIG. 4, the example in which the entire inward slope part 54 of the vehicle body floor 2 is accommodated within the closed cross-section of the floor frames 12 as the first frames is described, but the inward slope part 54 may project from the closed cross-section of the first frame at one end side thereof, or may penetrate the closed cross-section of the first frame.

Moreover, although in the above embodiment the example in which the floor frames 12 as the first frames are comprised of the upper frame members 61 disposed along the upper surface of the vehicle body floor 2, and the lower frame members 62 disposed along the lower surface of the vehicle body floor 2 is described, but the first frame may only be provided with the member disposed along the upper surface, and the member disposed along the lower surface of the vehicle body floor may be omitted.

Further, although in the embodiment the example in which the slanting frames 18 as the second frames is comprised of one member is described, but the second frames may each be comprised of two or more members joined to each other.

As described above, according to the present disclosure, since it becomes possible to improve the distribution effect of the impact load caused by the small overlap collision by utilizing the load transmitting path via the slanting frames and the floor frames, it may be used suitably in the manufacturing industry field of vehicles provided with this kind of lower vehicle body structure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Vehicle Body Floor
3 Bottom Surface Part
4 Side Sill
12 Floor Frame (First Frame)
18 Slanting Frame (Second Frame)
50 Floor Tunnel
51 Raised Part
52 Middle Part
53 Lowered Part
54 Inward Slope Part
55 Outward Slope Part
56 Joined Part
61 Upper Frame Member
62 Lower Frame Member

What is claimed is:

1. A lower vehicle body structure, comprising:
   a vehicle body floor having a bottom surface part;
   a floor tunnel bulging upwardly from the bottom surface part of the vehicle body floor, and extending in vehicle front-and-rear directions;
   side sills extending in the vehicle front-and-rear directions along edge parts of the vehicle body floor in vehicle width directions;
   hinge pillars extending upwardly from front end parts of the side sills;
   first frames, each extending in the vehicle front-and-rear directions at least along an upper surface of the vehicle body floor, between the floor tunnel and one of the side sills;
   lowered parts, each provided to the bottom surface part between one of the first frames and one of the side sills so as to be lowered below a part where the vehicle body floor and the side sills are joined; and
   second frames, each provided so as to extend to one of the first frames, obliquely rearward from one of the side sills along an upper surface of the bottom surface part and inwardly in the vehicle width directions, and forming in a part including one of the lowered parts a closed cross-section with the bottom surface part.

2. The lower vehicle body structure of claim 1, wherein the bottom surface part has outward slope parts, each extending obliquely upward toward one of the side sills from an outer end part of one of the lowered parts in the vehicle width directions.

3. The lower vehicle body structure of claim 1, wherein the bottom surface part has inward slope parts, each extending obliquely upward toward the floor tunnel from an inner end part of one of the lowered parts in the vehicle width directions.

4. The lower vehicle body structure of claim 2, wherein the bottom surface part has inward slope parts, each extending obliquely upward toward the floor tunnel from an inner end part of one of the lowered parts in the vehicle width directions.

5. The lower vehicle body structure of claim 3, wherein each of the first frames includes an upper frame member joined to the upper surface of the vehicle body floor, and a lower frame member joined to a lower surface of the vehicle body floor so as to form with the upper frame member a closed cross-section continuing in the vehicle front-and-rear directions, and
   wherein at least a part of each inward slope part is disposed within the closed cross-section formed by one of the upper frame members and one of the lower frame members.

6. The lower vehicle body structure of claim 4, wherein each of the first frames includes an upper frame member joined to the upper surface of the vehicle body floor, and a lower frame member joined to a lower surface of the vehicle body floor so as to form with the upper frame member a closed cross-section continuing in the vehicle front-and-rear directions, and
   wherein at least a part of each inward slope part is disposed within the closed cross-section formed by one of the upper frame members and one of the lower frame members.

7. The lower vehicle body structure of claim 1, wherein each of the side sills forms a closed cross-section continuing in the vehicle front-and-rear directions, and
   wherein each of the lowered parts is located below a lower end of one of the closed cross-sections of the side sills, within a section in the vehicle front-and-rear directions where the closed cross-section is formed between one of the lowered parts and one of the second frames.

8. The lower vehicle body structure of claim 2, wherein each of the side sills forms a closed cross-section continuing in the vehicle front-and-rear directions, and
   wherein each of the lowered parts is located below a lower end of one of the closed cross-sections of the side sills, within a section in the vehicle front-and-rear directions where the closed cross-section is formed between one of the lowered parts and one of the second frames.

9. The lower vehicle body structure of claim 3, wherein each of the side sills forms a closed cross-section continuing in the vehicle front-and-rear directions, and
   wherein each of the lowered parts is located below a lower end of one of the closed cross-sections of the side sills, within a section in the vehicle front-and-rear directions where the closed cross-section is formed between one of the lowered parts and one of the second frames.

10. The lower vehicle body structure of claim 4, wherein each of the side sills forms a closed cross-section continuing in the vehicle front-and-rear directions, and
    wherein each of the lowered parts is located below a lower end of one of the closed cross-sections of the side sills, within a section in the vehicle front-and-rear directions where the closed cross-section is formed between one of the lowered parts and one of the second frames.

11. The lower vehicle body structure of claim 5, wherein each of the side sills forms a closed cross-section continuing in the vehicle front-and-rear directions, and
   wherein each of the lowered parts is located below a lower end of one of the closed cross-sections of the side sills, within a section in the vehicle front-and-rear directions where the closed cross-section is formed between one of the lowered parts and one of the second frames.

12. The lower vehicle body structure of claim 6, wherein each of the side sills forms a closed cross-section continuing in the vehicle front-and-rear directions, and
   wherein each of the lowered parts is located below a lower end of one of the closed cross-sections of the side sills, within a section in the vehicle front-and-rear directions where the closed cross-section is formed between one of the lowered parts and one of the second frames.

* * * * *